United States Patent
Tanaka et al.

(10) Patent No.: US 10,830,180 B2
(45) Date of Patent: Nov. 10, 2020

(54) ENGINE AFT SECTION STRUCTURE

(71) Applicant: IHI Corporation, Koto-ku (JP)

(72) Inventors: Shinji Tanaka, Tokyo (JP); Katsuyoshi Takahashi, Tokyo (JP); Jun Hosoi, Tokyo (JP)

(73) Assignee: IHI Corporation, Koto-ku (JP)

( * ) Notice: Subject to any disclaimer, the term of this patent is extended or adjusted under 35 U.S.C. 154(b) by 346 days.

(21) Appl. No.: 15/671,788

(22) Filed: Aug. 8, 2017

(65) Prior Publication Data

US 2017/0370327 A1 Dec. 28, 2017

Related U.S. Application Data

(63) Continuation of application No. PCT/JP2015/067280, filed on Jun. 16, 2015.

(51) Int. Cl.
| | |
|---|---|
| *F02K 3/10* | (2006.01) |
| *F23R 3/18* | (2006.01) |
| *F02K 1/78* | (2006.01) |

(52) U.S. Cl.
CPC ............ *F02K 3/10* (2013.01); *F02K 1/78* (2013.01); *F23R 3/18* (2013.01); *F05D 2220/323* (2013.01)

(58) Field of Classification Search
CPC ... F02K 3/105; F02K 3/10; F02K 3/18; F02K 3/20; F02K 3/08; F23R 3/18; F23R 3/20; F23R 3/22; F23R 3/60
See application file for complete search history.

(56) References Cited

U.S. PATENT DOCUMENTS

| | | | |
|---|---|---|---|
| 3,176,465 A | 4/1965 | Colley, Jr. | |
| 3,747,345 A | 7/1973 | Markowski | |
| 5,203,796 A * | 4/1993 | Washam | F23R 3/20 60/737 |
| 5,233,827 A * | 8/1993 | Johnson | F02K 1/825 60/226.1 |

(Continued)

FOREIGN PATENT DOCUMENTS

| | | |
|---|---|---|
| GB | 745697 A | 2/1956 |
| GB | 870268 A | 6/1961 |

(Continued)

OTHER PUBLICATIONS

Extended European Search Report dated Jul. 17, 2018 in European Patent Application No. 15895561.7, 7 pages.

(Continued)

*Primary Examiner* — Ehud Gartenberg
*Assistant Examiner* — Jacek Lisowski
(74) *Attorney, Agent, or Firm* — Oblon, McClelland, Maier & Neustadt, L.L.P.

(57) ABSTRACT

An aft section structure of a jet engine with an axis is comprised of a casing defining a duct around the axis and opened axially fore and aft; a cone tapering aftward at a first angle with the axis and having a pointed end; guide vanes, each of the vanes radially extending from the cone to the casing and comprising a pressure side at a second angle with a plane containing the axis; spray bars, each of the spray bars extending radially within the duct and comprising trailing sides, each of the trailing sides being directed aftward at a third angle with a plane containing the axis; and flame holders, each of the flame holders extending radially within the duct and comprising one or more interior sides, each of the interior sides being directed aftward at a fourth angle with a plane containing the axis.

2 Claims, 6 Drawing Sheets

(56) References Cited

U.S. PATENT DOCUMENTS

| | | | |
|---|---|---|---|
| 5,437,159 A | 8/1995 | Ansart et al. | |
| 7,437,876 B2 * | 10/2008 | Koshoffer | F02K 3/10 60/737 |
| 7,467,518 B1 | 12/2008 | Vermeersch | |
| 8,061,144 B1 * | 11/2011 | Maguire | F02K 3/10 60/262 |
| 2005/0262847 A1 | 12/2005 | Koshoffer | |
| 2006/0016192 A1 | 1/2006 | Bunel et al. | |
| 2006/0213180 A1 | 9/2006 | Koshoffer | |
| 2007/0220893 A1 * | 9/2007 | Woltmann | F23R 3/20 60/765 |
| 2007/0245743 A1 | 10/2007 | Hautman et al. | |
| 2009/0260366 A1 | 10/2009 | Bunel et al. | |
| 2010/0050651 A1 | 3/2010 | Dindar et al. | |
| 2014/0360197 A1 | 12/2014 | Tanaka et al. | |

FOREIGN PATENT DOCUMENTS

| | | |
|---|---|---|
| JP | 8-61093 | 3/1996 |
| JP | 9-256906 | 9/1997 |
| JP | 9-268947 | 10/1997 |
| JP | 11-121972 | 4/1999 |
| JP | 2004-137950 | 5/2004 |
| JP | 2006-2621 | 1/2006 |
| JP | 2007-168491 | 7/2007 |
| JP | 2007-187150 | 7/2007 |
| JP | 2010-53866 | 3/2010 |
| JP | 2010-112298 | 5/2010 |
| JP | 2010-180756 | 8/2010 |
| JP | 2012-132629 | 7/2012 |
| JP | 2013-181473 | 9/2013 |
| JP | 2014-70548 | 4/2014 |

OTHER PUBLICATIONS

International Search Report dated Sep. 29, 2015 in PCT/JP2015/067280, filed on Jun. 16, 2015 (with English translation).
Written Opinion dated Sep. 29, 2015 in PCT/JP2015/067280, filed on Jun. 16, 2015.

* cited by examiner

ENGINE AFT SECTION STRUCTURE

CROSS-REFERENCE TO RELATED APPLICATIONS

This application is a Continuation Application of PCT International Application No. PCT/JP2015/067280 (filed Jun. 16, 2015), the entire contents of which are incorporated herein by reference.

BACKGROUND

Technical Field

The disclosure herein relates to a structure for an aft section of a jet engine, and in particular to an aft section structure which suppresses reflection of a radar wave.

Description of the Related Art

An airframe of an aircraft generally functions as an effective reflector reflecting radar waves such as microwaves. Its engine in addition generates infrared rays steadily. They are frequently used for identifying the location of the aircraft. Aircrafts for special purposes, however, are required to avoid being pinpointed or more specifically necessitate so-called stealth capability. The following literatures disclose so-called stealth technologies.
Japanese Patent Application Laid-open No. 2010-112298
Japanese Patent Application Laid-open No. 2010-180756
Japanese Patent Application Laid-open No. 2004-137950

SUMMARY

While the up-to-date stealth technologies have provided measures mainly against radar waves coming from the front and the side relative to the airframe, it is still not enough to address radar waves coming from the rear and reflected at the rear end or the interior of the engine. In particular, if the radar waves come from straight behind the engine, this means that another aircraft must stay on the tail. Then the aircraft requiring the stealth capability must face an immediate threat. The present inventors have found technical problems therefrom and reached the device disclosed herein in light of reducing the radar waves coming from the rear, in particular from straight behind the jet engine, and being reflected to the same direction.

According to an aspect, an aft section structure of a jet engine has an axis and the aft section structure is comprised of a casing defining a duct around the axis and opened axially fore and aft; a cone tapering aftward at a first angle with the axis and having a pointed end; one or more guide vanes, each of the vanes radially extending from the cone to the casing and comprising a pressure side at a second angle with a plane containing the axis; one or more spray bars, each of the spray bars extending radially within the duct and comprising one or more trailing sides, each of the trailing sides being directed aftward at a third angle with a plane containing the axis; and one or more flame holders, each of the flame holders extending radially within the duct and comprising one or more interior sides, each of the interior sides being directed aftward at a fourth angle with a plane containing the axis.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

Figure 1:
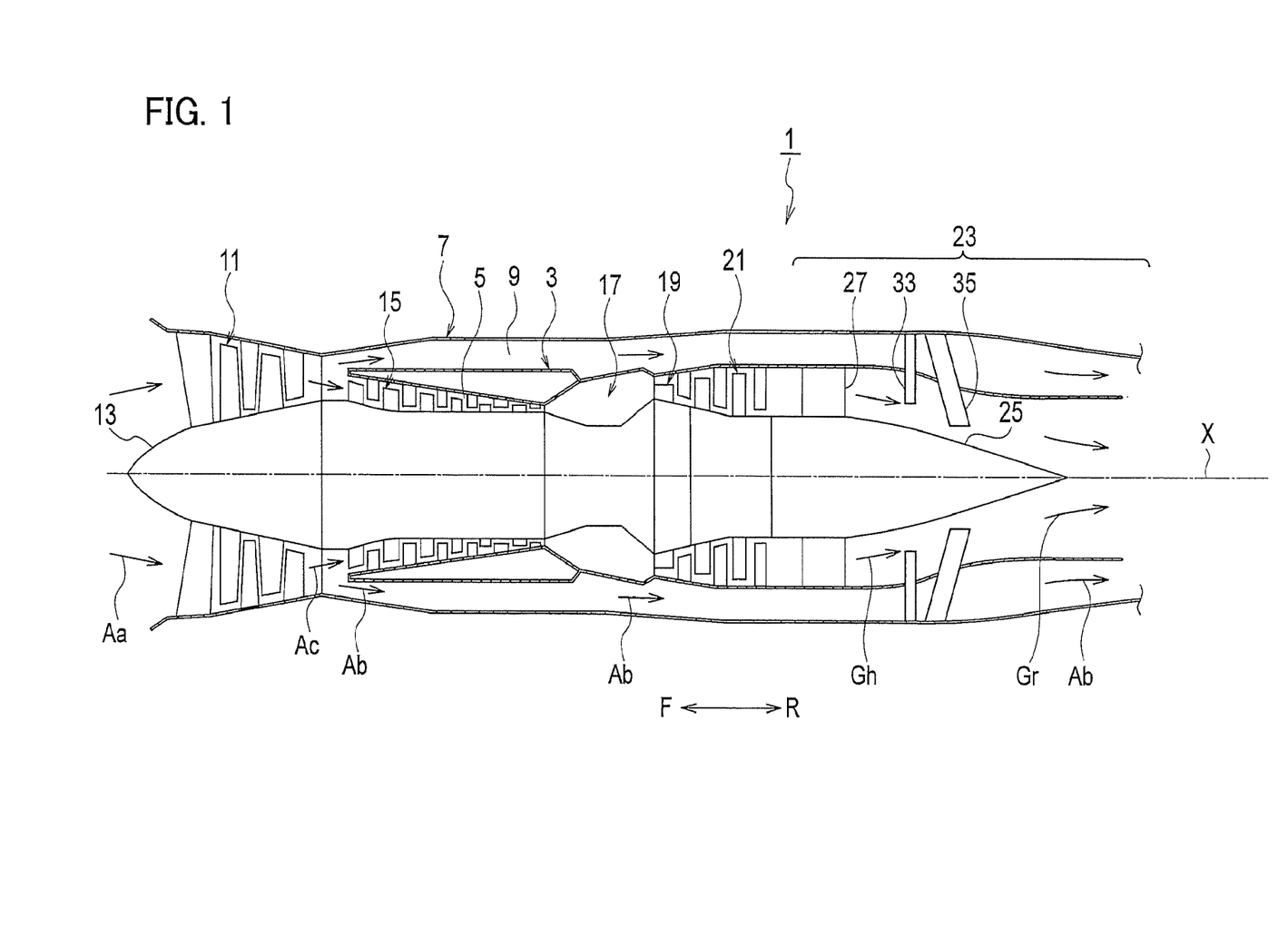
FIG. 1 is a side sectional view of a jet engine according to an embodiment.

Referring to FIG. 1, a jet engine 1 according to the present embodiment is for example loaded in a fuselage of an aircraft, or fixedly loaded on the exterior of main wings or the fuselage, and is there used to give thrust force to the aircraft. The following description is, for the convenience of explanation, based on an example in which the jet engine 1 is a so-called low-bypass turbofan engine, but is not necessarily limited thereto.

The jet engine 1 is generally comprised of a fan or low-pressure compressor 11, a high-pressure compressor 15, a combustor 17, a high-pressure turbine 19, a low-pressure turbine 21, and an aft section structure 23, which are arranged along an axis X in this order from its nose F to its tail R of the aircraft. All of them are encased in an engine casing 7, and further the high-pressure compressor 15, the combustor 17, and the turbines 19, 21 are encased in the core casing 3 deeper inside thereof.

Defined by the engine casing 7 and the core casing 3 is a bypass duct 9, an entrance of which is opened just behind the fan or low-pressure compressor 11 and an exit of which is in spatial communication with an exhaust nozzle. The core casing 3 defines a series of ducts including a compressor duct 5 and a hot gas duct 29 inside itself and this series of ducts is also in spatial communication with the exhaust nozzle.

The fan or low-pressure compressor 11 is constituted of rotor blades and stator vanes respectively arranged around an inlet cone 13, and plural stages of rotor blades and plural stages of stator vanes are axially alternately arranged. These rotor blades are combined with the low-pressure turbine 21 and they are supported in such a way as to commonly rotate. The turbines 21, 19 respectively extract energy in part from the hot gas generated by the combustor 17 to drive the fan or compressors 11, 15.

The fan or low-pressure compressor 11 sucks the ambient air Aa, part of which bypasses the engine core and passes through the bypass duct 9 to reach the exhaust nozzle at the back thereof. Compressed air Ac, as another part of the sucked air, is fed into the compressor duct 5, further compressed in the high-pressure turbine 19, and fed into the combustor 17 so as to be used for combustion and generate hot gas Gh. The hot gas Gh in some instances passes through the aft section structure 23 but is in other instances reheated in the aft section structure 23 and gushes toward the exhaust nozzle. The bypass air Ab and the hot gas Gh or reheated gas Gr join together at the exhaust nozzle, or some or all of the bypass air Ab joins with the hot gas Gh at an upstream site from the aft section structure 23, and gushes together out of the exhaust nozzle to create thrust force.

Figure 2:
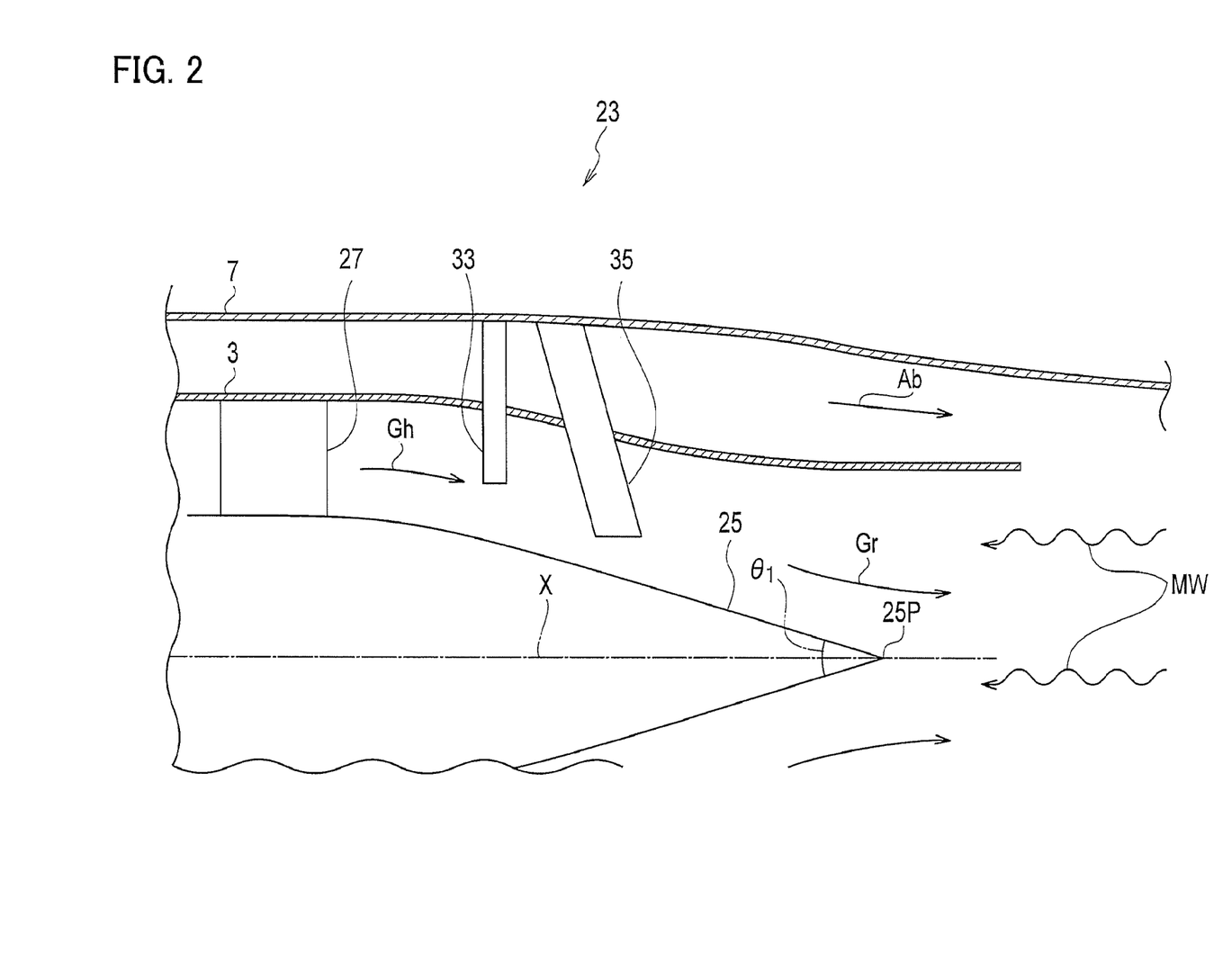
FIG. 2 is a partial side sectional view of the jet engine, which enlarges an aft section structure in particular.

Referring to FIG. 2 in combination with FIG. 1, the aft section structure 23 is in spatial communication with the low-pressure turbine 21 and is, within the hot gas duct 29, comprised of a cone 25 around the axis X, a plurality of guide vanes 27 respectively extending radially from the cone 25, a plurality of spray bars 33 respectively extending radially, and a plurality of flame holders 35 respectively extending radially.

The cone 25 tapers toward the tail R and may include a pointed rear end 25P. The outer surface of the cone 25, at least around the rear end 25P, may be substantially a conical surface.

Each guide vane 27 is arranged just downstream from the low-pressure turbine 21 and has a so-called airfoil shape in general to rectify the hot gas Gh. Each guide vane 27 extends from the outer surface of the cone 25 to reach the internal surface of the core casing 3, thereby radially spanning the whole width of the hot gas duct 29. Each guide vane 27 may have a proper angle with a direction where the hot gas Gh flows although its details will be described later. That is, its airfoil surface may, in other words, be comprised of a pressure side 27p directed to the tail R to some extent and a suction side directed to the nose F to some extent. In addition, the guide vanes 27 may be solid but may have a hollow structure.

The spray bars 33 are structures for supplying additional fuel to the hot gas Gh and may be arranged downstream from the guide vanes 27 relative to the flow of the hot gas Gh. Each spray bar 33 extends radially inwardly from the core casing 3 or the engine casing 7 for example into the hot gas duct 29. Any shape less likely to create drag on the flow of the hot gas Gh could be applied to the spray bar 33. Any droplet shape in section for example may be applied thereto.

The flame holders 35 are structures for igniting the additionally supplied fuel and holding the combustion flames at the downstream sides, and are generally arranged downstream from the spray bars 33 relative to the flow of the hot gas Gh. Each flame holder 35 also extends radially inwardly from the core casing 3 or the engine casing 7 for example into the hot gas duct 29. To the flame holder 35, a shape adapted to locally slow down the flow speed of the hot gas Gh is generally applied. Applicable thereto is, for example, any V-letter gutter shape forming a V-letter shape spreading toward the tail R in section.

As will be understood from the above description, as the fuel supplied from the spray bars 33 combusts at the flame holders 35, the hot gas Gh is reheated so that the reheated gas Gr at an accelerated speed gushes out of the exhaust nozzle. This is used for temporarily boosting the thrust force by the jet engine 1.

As the exhaust nozzle generally has a considerably wide aperture, it cannot prevent radar waves (microwaves) from intruding into the interior. On the other hand, referring to FIG. 3 in combination with FIGS. 1, 2, the cone 25, the guide vanes 27, the spray bars 33 and the flame holders 35 are exposed backward relative to the jet engine 1 when viewed on a cross section in the hot gas duct 29. Microwaves MW intruding from the rear through the exhaust nozzle along the axis X can be reflected by these elements. If these elements have sides perpendicular to the axis X, these sides intensify the reflected waves back in the direction where the microwaves MW come. In contrast, if the sides are properly oblique, the reflected waves back in the coming direction are weakened because the reflected waves travel in directions different therefrom. In the present embodiment, as described below, the respective sides are made oblique so as to weaken the reflected waves.

Figure 3:
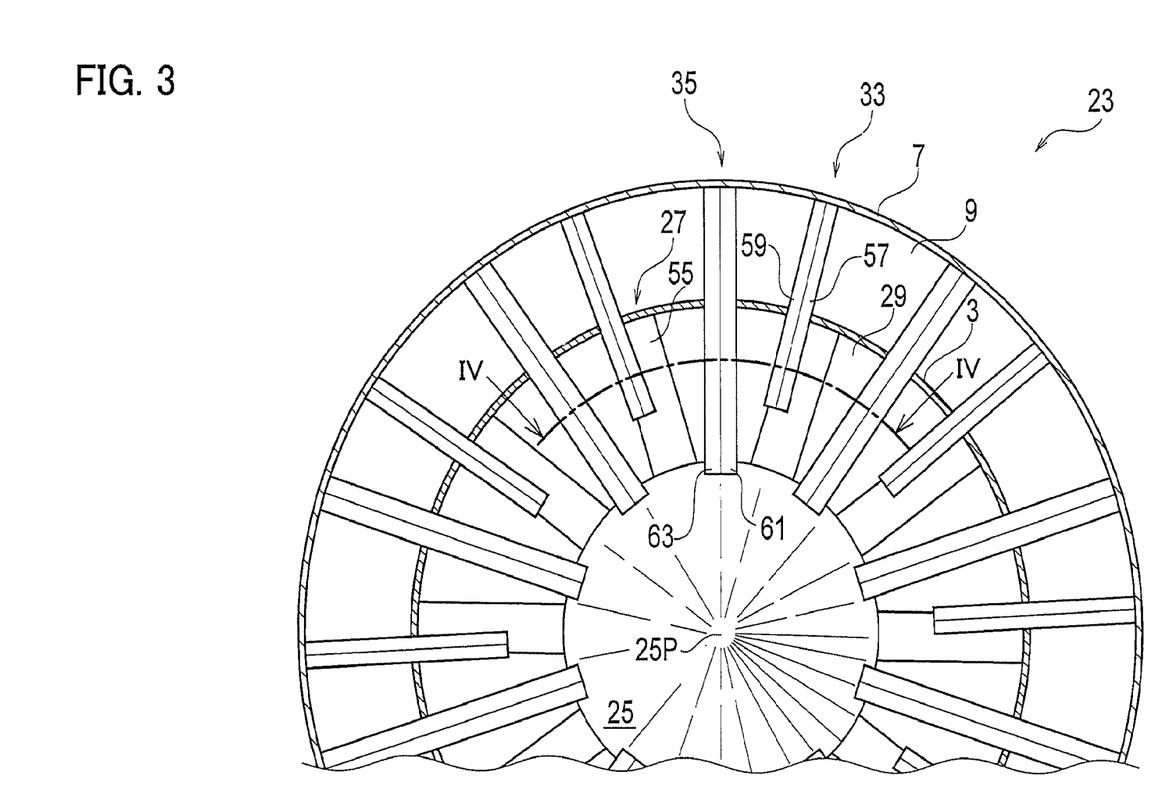
FIG. 3 is an elevational view of the aft section structure viewed from the back.

The cone 25 is in a shape of a cone or in a shape approximate to a cone, and its outer surface is at a first angle $\theta 1$ with the axis X. The first angle $\theta 1$ is of course over 0 degree (parallel to the axis X) and less than 90 degrees (perpendicular to the axis X). The rear end 25P is preferably pointed and the radius of curvature thereof may be sufficiently reduced as compared with the wavelength of the microwaves MW (1-10 cm in the SHF band for example) and be 5 mm or less for example.

Figure 4:
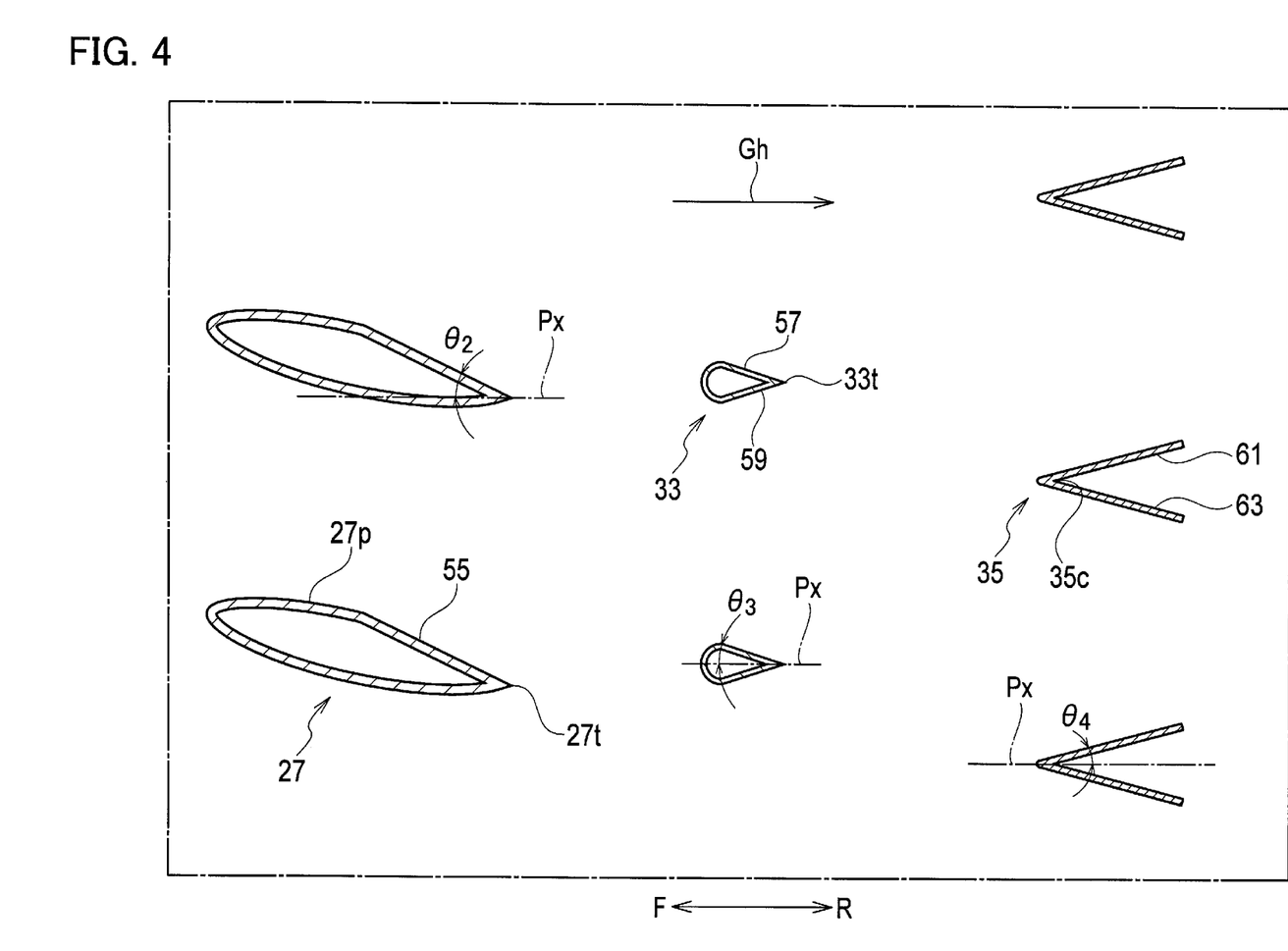
FIG. 4 is a sectional view of guide vanes, spray bars and flame holders, which is taken from a line IV-IV of FIG. 3.

Referring to FIG. 4, the pressure side 27p of the guide vane 27 is, as described already, directed to the tail R to some extent and in particular a surface 55 around its trailing edge 27t is, as being apparent from FIG. 3, exposed backward. This surface 55 may be at a second angle $\theta 2$ with a plane Px containing the axis X. The second angle $\theta 2$ is also over 0 degree and less than 90 degrees. The trailing edge 27t is also preferably pointed and its radius of curvature may be 5 mm or less for example.

Referring again to FIG. 4, in regard to each spray bar 33 if it has a droplet shape in section, a pair of trailing sides 57, 59 having a trailing edge 33t put therebetween is exposed rearward. In addition, only these trailing sides 57, 59 may be exposed rearward. Each trailing side 57, 59 may be at a third angle $\theta 3$ with a plane Px containing the axis X. The third angle $\theta 3$ is also over 0 degree and less than 90 degrees. The trailing edge 33t is also preferably pointed and its radius of curvature may be 5 mm or less for example.

In regard to each flame holder 35 if it has a V-letter gutter shape, a pair of interior sides 61, 63 having its interior bottom 35c put therebetween is exposed rearward. In addition, only these interior sides 61, 63 may be exposed rearward. Each interior side 61, 63 may be at a fourth angle $\theta 4$ with a plane Px containing the axis X. The fourth angle $\theta 4$ is also over 0 degree and less than 90 degrees. The bottom 35c and the trailing edges of each flame holder 35 are also preferably pointed and these radii of curvature may be 5 mm or less for example.

Any of these structures prevents the microwaves MW from being reflected back in a direction where they come and diverts the reflected waves toward a direction different therefrom with a certain angle. While the angles $\theta 1$, $\theta 2$, $\theta 3$, $\theta 4$ may be arbitrarily selected from a range over 0 degree and less than 90 degrees, they are preferably 5 degrees or more and 45 degrees or less, or more preferably 10 degrees or more and 30 degrees or less, in light of diversion of the microwaves toward a sufficiently different direction. Further, these angles may be either substantially identical or differentiated, and further the angles $\theta 2$, $\theta 3$, $\theta 4$ may be in a range of ±5 degrees relative to the angle $\theta 1$.

Referring again to FIG. 3, a ratio for which the exposed area of the cone 25, the guide vanes 27, the spray bars 33 and the flame holders 35 accounts of the sectional area of the hot gas duct 29 may be properly regulated, and this ratio may be 50% or more, or 70% or more for example. It is unavoidable that the resonance effect acts on part of the intruding microwaves and this effect also makes the microwaves reflected. As the exposed area is greater, however, the ratio of the directly reflected waves comes greater as compared with the reflected waves by the resonance effect. In addition, the ratio of the reflected waves diverted in a certain angle is made greater in accordance with the present embodiment.

Consequently the ratio of the microwaves reflected back in the direction where they comes is made relatively lower.

Figure 5A:
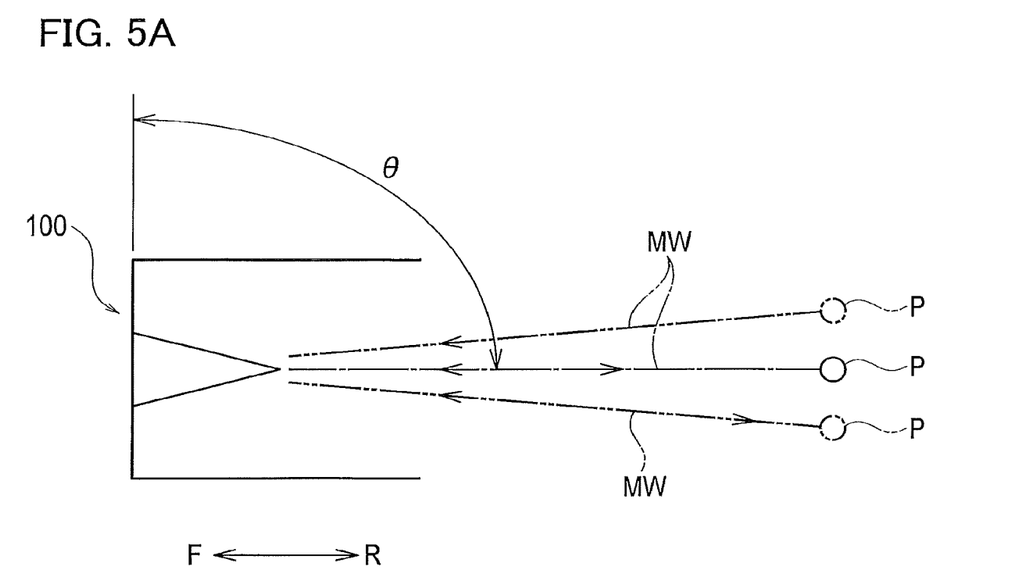
FIG. 5A is a schematic side view schematically showing a state where radar waves coming from the back are reflected in a case where the aft section structure comprises a cone.
Figure 5B:
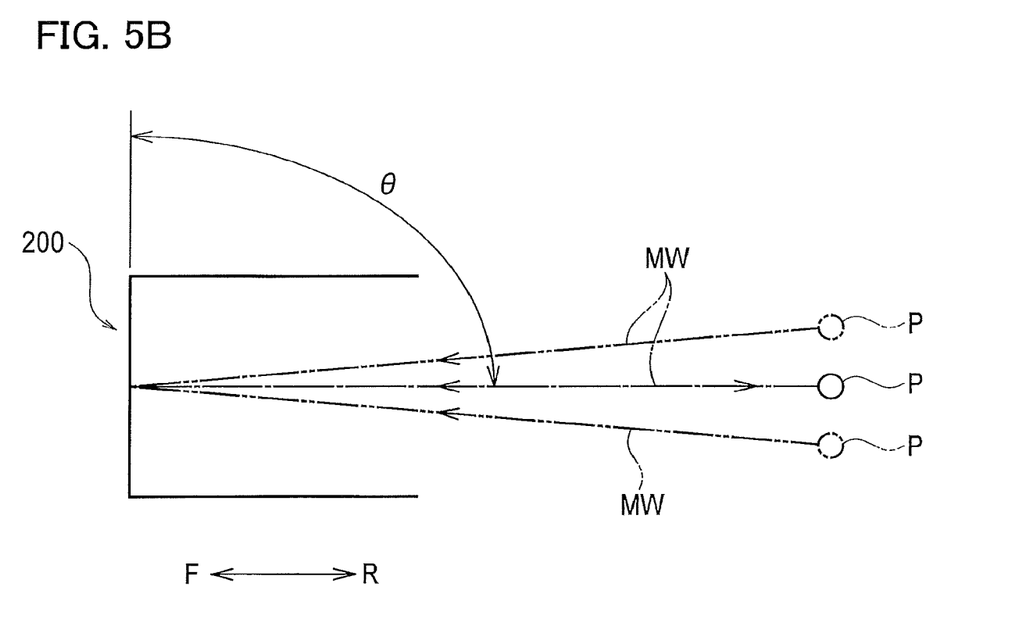
FIG. 5B is a schematic side view schematically showing a state where radar waves coming from the back are reflected in a case where the aft section structure fails to comprise a cone.

To assess the effect of reducing reflection of microwaves by the present embodiment, calculations of reflection intensity of the microwaves based on numerical analysis had been carried out. FIGS. 5A, 5B show schematic drawings of models 100, 200 used in the analysis.

The model 100 shown in FIG. 5A is comprised of a cylinder that simulates a hot gas duct, a plane in the cylinder, which simulates guide vanes arranged circumferentially, and a cone extending rearward from the plane and having a pointed rear end. Trailing edges of the guide vanes are in general arranged on a plane perpendicular to the axis of the engine. If spaces therebetween are sufficiently narrow, they behave like a plane in relation to microwaves and thus it is proper to make the plane simulate the guide vanes.

The model 200 shown in FIG. 5B has a similar structure but is characterized by an absence of the cone.

Intensities of microwaves MW that were initially radiated from a point P toward the interior of the cylinders and reflected back to the point P were respectively calculated on the presumption that no absorption occurs. The angle θ to the plane in the cylinder was varied and then each calculation was made.

Figure 6:
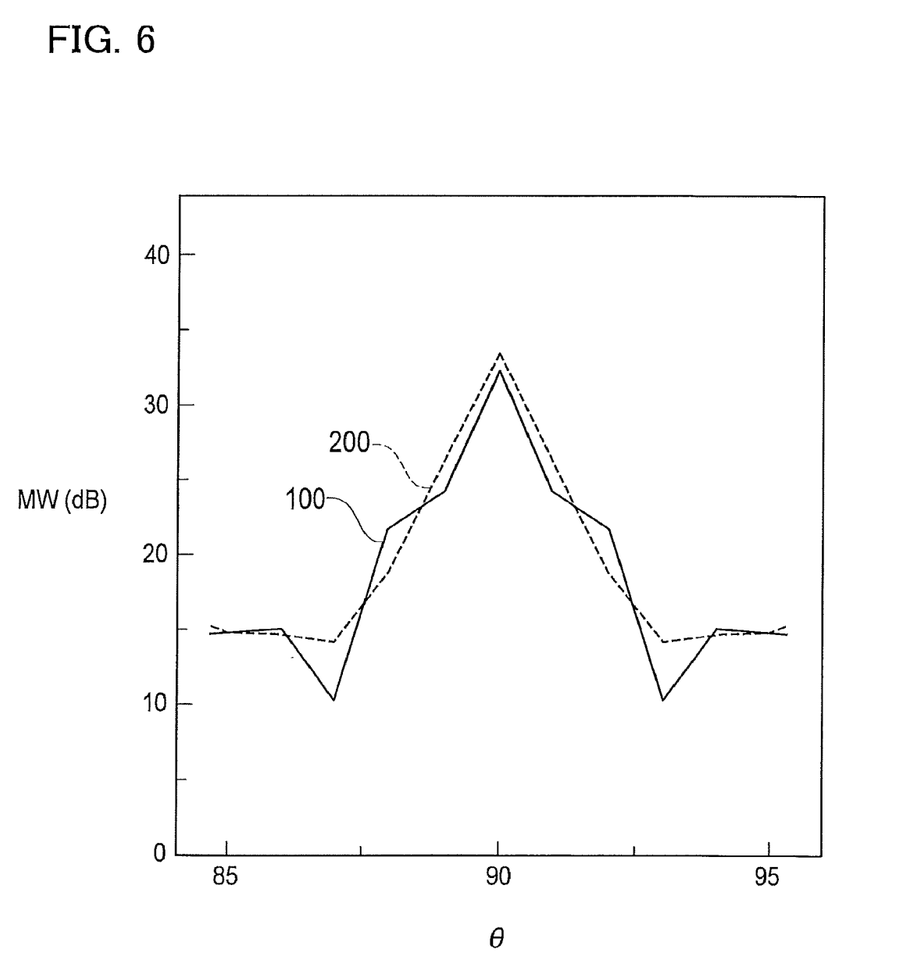
FIG. 6 is a graph depicting a relation between angles of reflection and intensity of reflected radar waves.

Calculation results are shown in FIG. 6. The vertical axis represents reflection intensities in dB. Because the angle to the plane simulating the guide vanes is defined as θ, θ=90 degrees is corresponding to a place just behind the engine. The reflection intensities in the model 100 are smaller at and around the point of θ=90, whereas they may occasionally be larger at the other points.

As described already, to aircrafts requiring stealth capability, situations where microwaves come from straight behind them are the most critical. In these particular situations, the present embodiment is beneficial in reducing the reflection intensities of the microwaves.

Although certain embodiments have been described above, modifications and variations of the embodiments described above will occur to those skilled in the art, in light of the above teachings.

INDUSTRIAL APPLICABILITY

An aft section structure is provided, which reduces reflection of radar waves toward the back of the jet engine, in particular just behind the engine.

What is claimed is:

1. An aft section structure of a jet engine having an axis, comprising:
   a casing defining a duct around the axis and opened axially fore and aft;
   a cone tapering aftward at a first angle with the axis and having a pointed end;
   one or more guide vanes, each of the one or more guide vanes radially extending from the cone to the casing and comprising a pressure side at a second angle with the plane containing the axis;
   one or more spray bars, each of the one or more spray bars extending radially within the duct and comprising one or more trailing sides, each of the one or more trailing sides being directed aftward at a third angle with the plane containing the axis; and
   one or more flame holders, each of the one or more flame holders extending radially within the duct and comprising one or more interior sides, each of the one or more interior sides being directed aftward at a fourth angle with plane containing the axis,
   wherein any of the first, the second, the third, and the fourth angles is between 0 and 45 degrees, and
   wherein the first, the second, the third, and the fourth angles are identical.

2. The aft section structure of claim 1, wherein, when viewed from an axially back, the one or more spray bars expose only the one or more trailing sides and the one or more flame holders expose only the one or more interior sides.

* * * * *